United States Patent [19]

Imagawa

[11] Patent Number: 4,954,174

[45] Date of Patent: Sep. 4, 1990

[54] ERASABLE INK COMPOSITIONS

[75] Inventor: Kiyotaka Imagawa, Osaka, Japan

[73] Assignee: Sakura Color Products Corporation, Osaka, Japan

[21] Appl. No.: 235,569

[22] Filed: Aug. 24, 1988

[30] Foreign Application Priority Data

Aug. 24, 1987 [JP] Japan ................. 62-209545

[51] Int. Cl.$^5$ .................. C09D 11/16; C09K 3/00
[52] U.S. Cl. .................. 106/27; 106/30; 106/32; 106/32.5
[58] Field of Search .............. 106/20, 22, 27, 32, 106/32.5, 30, 23

[56] References Cited

U.S. PATENT DOCUMENTS

| | | | |
|---|---|---|---|
| 3,914,131 | 10/1975 | Hutchison | 106/19 |
| 4,193,906 | 3/1980 | Hatanaka | 106/23 |
| 4,256,494 | 3/1981 | Yamamoto et al. | 106/27 |
| 4,525,216 | 6/1985 | Nakanishi | 106/23 |
| 4,578,117 | 3/1986 | Nakanishi | 106/27 |
| 4,822,417 | 4/1989 | Kobayashi et al. | 106/23 |

FOREIGN PATENT DOCUMENTS 108270 6/1983 Japan .

*Primary Examiner*—Paul Lieberman
*Assistant Examiner*—Helene Klemanski
*Attorney, Agent, or Firm*—Wegner & Bretschneider

[57] ABSTRACT

An erasable ink composition for use in writing with a marking pen which comprises an organic solvent, optionally a resin soluble in the solvent, a pigment dispersed in the solvent and additives, the improvement in the additives comprising:

(a) a fatty acid monoester of an aliphatic alcohol wherein the fatty acid has not less than six carbons in amounts of about 0.5–20% by weight;

(b) a fatty acid triglyceride in amounts of about 0.5–20% by weight;

(c) a higher aliphatic hydrocarbon which is liquid at normal temperatures is amounts of about 0.2–5% by weight; and (d) a polyoxyethylene alkyl ether phosphoric acid ester in amounts of about 0.5–7% by weight; each based on the ink composition.

The writings with the ink composition is erasable even after a long standing.

7 Claims, No Drawings

ERASABLE INK COMPOSITIONS

This invention relates to an erasable ink composition, and more particularly to an ink composition for use in writing with a marking pen which forms or an impervious writing surface readily erasable writings even after standing for a long period of time.

There are already known a variety of ink compositions for use in writing with a marking pen which form on an impervious writing surface, such as of enamel, resin or metal, writings erasable by wiping lightly with cloth or paper. These erasable ink compositions usually contain an additive called a separating agent together with an organic solvent, a pigment and a resin.

For example, there is described in Japanese Patent Publication No. 62-9149 an erasable ink composition which contains an aliphatic dibasic carboxylic acid diester and an aliphatic monobasic carboxylic acid ester together with a surfactant, a polyester resin and a saturated fatty acid triglyceride. However, this ink compositions forms writings which are not readily erased when the writing are left standing for a long period, and the writing stains a writing surface.

The present inventors have made intensive investigations to solve the above-mentioned problem involved in the prior erasable ink composition, and found that the incorporation of a specific combination of the separating agent into an ink composition improves remarkably the erasability of writings after standing for a long period of time.

The erasable ink composition for use in writing with a marking pen comprises an organic solvent, optionally a resin soluble in the solvent, a pigment dispersed in the solvent and additives, the improvement in the additives comprising:

(a) a fatty acid monoester of an aliphatic alcohol wherein the fatty acid has not less than six carbons in amounts of about 0.5–20% by weight;

(b) a fatty acid triglyceride in amounts of about 0.5–20% by weight;

(c) a higher aliphatic hydrocarbon which is liquid at normal temperatures in amounts of about 0.2–5% by weight; and (d) a polyxoyethylene alkyl ether phosphoric acid ester in amounts of about 0.5–7% by weight; each based on the ink composition.

The organic solvent usable includes alcohols and cellosolves, and more specifically theremay be preferably used as the solvent, for example, methanol, ethanol, n-propanol, isopropanol, n-butanol, isobutanol, methyl cellosolve, ethylcellosolve, butyl cellosolve or a mixture of two or more of these. The organic solvent is used usually in amounts of about 50–90% by weight, preferably of about 70–85% by weight, based on the ink composition so that the ink composition has a viscosity suitable for writing with a marking pen.

The pigment is not specifically limited, but any pigment as known usable in ink compositions for use in a marking pen is usable in the invention. Thus, the pigment used includes, for example, carbon black, phthalocyanine blue, phthalocyanine green, permanent red 4R, lithol fast orange 3GK, and the like. However, a so-called resin-processed pigment is particularly preferred in the invention. The resin-processed pigment is a pigment coated with a resin, and is readily dispersible in an organic solvent, as is known. A variety of such resin-processed pigments are commercially available as, for example, Fuji AS Blue, Fuji AS Green, Fuji AS Red or Fuji AS Orange (All by Fuji Shikiso K. K., Japan), or Microlith Black C-A (by Ciba-Geigy).

The content of the pigment in the ink composition may be selected depending upon the pigment used or the darkness of writing required. However, when the content of pigments is too much, the pigment deposits in the ink composition, or the resultant ink composition has an excessively high viscosity, so that the composition clogs a pen tip, or writes poorly. On the other hand, when the content of pigments is too small, the ink composition fails to form writings of an appropriate darkness. Therefore, the pigment is contained usually in amounts of about 1–20% by weight, preferably of about 5–15% by weight, based on the ink composition. The pigment is dispersed in the ink composition.

The ink composition contains a resin so that not only has it a viscosity suitable for writing and the writing has a suitable adhesion to a writing surface, but also the writing therewith has a high erasability in conjunction with a separating agent whcih will be described hereinafter. Any resin known as usable in an ersable ink composition is usable in the invention. Therefore, the resin usable includes, for example, natural resins such as rosin or shellac; modified rosins such as rosin esters, hydrogenated rosins, rosin-modified maleic acid resins or rosin-modified phenol resins; various phenol resins; cellulosic resins such as ethyl cellulose resins or acetyl cellulose resins; ketone resins, petroleium resins, polyvinyl butyral resins, polyvinylpyrrolidone resins, vinylpyrrolidone-vinyl acetate copolymer resins, polyvinyl acetate resins or polyacrylic acid ester resins.

When the resin is used in excess amounts, it makes the viscosity of the ink composition too high and adversely affects the erasability of the writing formed therewith, whereas when the resin is used in too small amounts, the ink composition forms writings uneven in appearance. Therefore, the resin is contained in the ink composition usually in amounts of about 1–30% by weight, preferably in amounts of about 5–20% by weight.

When a resin-processed pigment is incorporated in the ink composition, a resin is not necessarily used, since the resin-processed pigment may be deemed as an integrate of a pigment and a resin.

The improvement in the erasable ink composition of the invention resides in the use of such additives as composed of three specific separating agents and a specific surfactant, as essential components.

The first additive is a fatty acid ester of an aliphatic alcohol wherein the fatty acid has not less than six carbons, preferably not less than eight carbons. The ester is often referred to as the monobasic carboxylic acid ester hereinafter, and may be exemplified by ethyl oleate, butyl laurate, hexyl laurate, isostearyl laurate, oleyl 2-ethylhexanoate, ethyl isostearate, butyl stearate, isopropyl myristate, butyl palmitate, isooctyl palmitate, isooctadecyl palmitate, isooctyl stearate and isooctadecyl stearate. The monobasic carboxylic acid ester may be used singly or as a mixture. In the invention, the monobasic carboxylic acid ester wherein the alcohol has not less than two carbons, preferably not less than four carbons, is particularly preferred since such esters provide an ink composition which forms writings more readily erasable even after standing for a long period.

The monobasic carboxylic acid ester is contained in the in composition usually in amounts of about 0.5–20% by weight, preferably in amounts of about 2–15% by weight, based on the ink composition. When the amount of the ester is too large, the resultant ink composition has an excessively high viscosity and it writes badly or it stains a writing surface. When the amount of the ester is too small, the resultant ink compositon is not readily erasable or separable from an impervious surface.

The second additive is a fatty acid triglyceride, and is contained in the ink composition usually in amounts of about 0.5–20% weight, preferably in amounts of about 2–15% by weight, based on the ink composition. It is preferred that the fatty acid component in the triglyceride has not less than six carbons, most preferably not less than eight carbons, thus, for example, caproic acid triglyceride, carprylic acid triglyceride, lauric acid triglyceride, 2-hexyldecanoic acid triglyceride or the like are preferred. The triglyceride may be a mixed triglyceride in which the fatty acid components are different from each other. Further, the triglyceride may be used singly or as a mixture.

The third additive is a higher aliphatic hydrocarbon which is liquid at normal temperatures, which may be exemplified by liquid paraffin. The higher aliphatic hydrocarbon is contained in the ink composition in amounts usually of about 0.2–5% by weight, preferably in amounts usually of about 0.5–3% by weight, based on the ink composition. When the amount is less than about 0.2% by weight based on the ink composition, the resultant ink composition is not improved in erasability after standing for a long period, whereas when the amount is more than about 5% by weight, the resultant ink composition is too high in viscosity and stains a writing surface.

The ink composition of the invention further contains a specific surfactant, a polyoxyethylene alkyl ethers phosphoric acid ester as the fourth additive. This surfactant is commercially available as "Plysurf" A208S, A212C or A207H by Daiichi Kogyo Seiyaku K. K., Japan. The surfactant is contained in the ink composition usually in amounts of about 0.5–7% by weight, preferably about 0.7–5% by weight based on the ink composition. When the amount of the surfactant is less than about 0.5% by weight based on the ink composition, the writing with the resultant ink composition is poorly erasable, whereas when the amount of the surfactant is more than about 7% by weight, the ink composition is undesirably of a high viscosity.

The ink composition of the invention may be produced in a conventional method known in the art. By way of example, a resin-processed pigment is added to a solvent and stirred, if necessary under heating, to disperse the pigment in the solvent uniformly, and then the additives are added to the mixture and stirred, if necessary under heating, thereby to provide an ink composition of the invention.

Although the invention is not limited by any theory, however, when writings are formed on an impervious writing surface with a marking pen, the writing is composed of a liquid layer consiting of the monobasic carboxylic acid ester, fatty acid triglyceride and higher aliphatic hydrocarbon in contact with the writing surface and a resin film layer containing the pigment and formed on the liquid layer with aid of the surfactant. Now that the liquid layer contains in particular the triglyceride and liquid hydrocarbon together, the ink composition of the invention is much more readily erasable after standing for a long period than the conventional ink compositions.

The invention will now be described with reference to examples, however, which are not to be construed as limiting to the invention.

EXAMPLE I

An ink composition was prepared, and writings were formed on impervious writing surfaces of melamine resin, enamel or fluorocarbon resin, respectively, and the writing was left standing at a temperature of 40° C. under a relative humidity of 35% for five minutes and for about one month, respectively, and then wiped lightly with dry cloth, to evaluate the erasability of the marking after five minutes (initial erasability) and after about one month (standing erasability).

The amounts of ingredients in the folllowing ink compositions are designated by parts by weight. The erasability was evaluated with the eyes: A, readily erasable; B, fairly erasable; C, only slightly erasable; and D, scarcely erasable. The results are shown in Table 1.

| Ink Composition 1 | |
|---|---|
| Resin-processed pigment (Fuji AS Black) | 8.0 |
| Organic solvent | |
| Ethanol | 70.0 |
| Isopropanol | 5.5 |
| Separating Agent | |
| Butyl stearate | 4.0 |
| Isopropyl myristate | 3.0 |
| Butyl palmitate | 3.0 |
| 2-Hexyldecanoic acid triglyceride | 4.0 |
| Liquid Paraffin | 0.5 |
| Surfactant | |
| Plysurf A208S | 1.0 |
| Plysurf A207H | 1.0 |
| Ink Composition 2 | |
| Resin-processed Pigment (Fuji AS Black) | 8.0 |
| Organic solvent | |
| Ethanol | 60.0 |
| Isopropanol | 10.0 |
| n-Butanol | 4.0 |
| Separating Agent | |
| Butyl isopalmitate | 10.0 |
| 2-Hexyldecanoic acid triglyceride | 5.0 |
| Liquid Paraffin | 1.0 |
| Surfactant | |
| Plysurf A207H | 2.0 |
| Ink Composition 3 | |
| Resin-processed pigment (Fuji AS Blue) | 8.5 |
| Organic solvent | |
| Ethanol | 75.0 |
| Separating Agent | |
| Butyl isostearate | 4.0 |
| Butyl laurate | 3.0 |
| Isostearin | 5.0 |
| Liquid Paraffin | 2.0 |
| Surfactant | |
| Plysurf A208S | 1.5 |
| Plysurf A212S | 1.0 |
| Ink Composition 4 | |
| Resin-processed pigment (Microlith Black C-A) | 7.0 |
| Organic solvent | |
| Ethanol | 65.0 |
| Isopropanol | 10.0 |
| Separating Agent | |
| Ethyl oleate | 4.5 |
| Isopropyl myristate | 4.5 |
| 2-Hexyldecanoic acid triglyceride | 4.0 |
| Liquid Paraffin | 3.0 |
| Surfactant | |
| Plysurf A208S | 2.0 |
| Ink Composition 5 | |
| Resin-processed pigment (Fuji AS Black) | 8.0 |
| Organic solvent | |
| Ethanol | 78.0 |

-continued

| Separating Agent | |
|---|---|
| Isostearyl laurate | 3.5 |
| Ethyl oleate | 3.5 |
| Capric acid triglyceride | 4.0 |
| Liquid Paraffin | 1.0 |
| Surfactant | |
| Plysurf A208S | 2.0 |
| Ink Composition 6 | |
| Resin-processed pigment (Fuji AS Blue) | 8.0 |
| Organic solvent | |
| Ethanol | 66.0 |
| Isopropanol | 10.0 |
| Separating Agent | |
| Isooctyl stearate | 7.0 |
| Lauric acid triglyceride | 5.0 |
| Liquid Paraffin | 2.0 |
| Surfactant | |
| Plysurf A207H | 1.0 |
| Plysurf A212S | 1.0 |
| Comparative Ink Composition 1 | |
| Resin-processed pigment (Fuji AS Black) | 8.0 |
| Organic solvent | |
| Ethanol | 70.0 |
| Isopropanol | 10.0 |
| Separating Agent | |
| Isopropyl myristate | 5.0 |
| Octyl stearate | 4.0 |
| Liquid Paraffin | 1.0 |
| Surfactant | |
| Plysurf A208S | 2.0 |
| Comparative Ink Composition 2 | |
| Resin-processed pigment (Fuji AS Blue) | 8.0 |
| Organic solvent | |
| Ethanol | 77.0 |
| Separating Agent | |
| Hexyl laurate | 5.0 |
| Butyl stearate | 5.0 |
| Oleyl 2-ethylhexanoate | 3.0 |
| Surfactant | |
| Plysurf A212S | 2.0 |
| Comparative Ink Composition 3 | |
| Resin-processed pigment (Fuji AS Black) | 8.0 |
| Organic solvent | |
| Ethanol | 70.0 |
| Isopropanol | 9.0 |
| Separating Agent | |
| Butyl stearate | 3.0 |
| Isopropyl myristate | 3.0 |
| Capric acid triglyceride | 5.0 |
| Surfactant | |
| Plysurf A208S | 1.0 |
| Plysurf A207H | 1.0 |

The comparative ink composition 1 contains no fatty acid triglyceride, the comparative ink composition 2 contains no liquid paraffin and triglyceride, and the comparative ink composition 3 contains no liquid paraffin.

TABLE 1

| | Erasability of Writing on | | |
|---|---|---|---|
| | Enamel | Melamine | Fluorocarbon |
| Example 1 | | | |
| Initial | A | A | A |
| Standing | A | A | B |
| Example 2 | | | |
| Initial | A | A | A |
| Standing | A | A | B |
| Example 3 | | | |
| Initial | A | A | A |
| Standing | A | A | A |
| Example 4 | | | |
| Initial | A | A | A |
| Standing | A | A | A |
| Example 5 | | | |
| Initial | A | A | A |
| Standing | A | B | B |
| Example 6 | | | |
| Initial | A | A | A |
| Standing | A | B | A |
| Comparative 1 | | | |
| Initial | B | B | B |
| Standing | D | D | C |
| Comparative 2 | | | |
| Initial | B | B | B |
| Standing | D | D | D |
| Comparative 3 | | | |
| Initial | B | B | B |
| Standing | C | D | D |

EXAMPLE II

An ink composition was prepared which was composed of 8.5% by weight of Fuji AS Blue, 76.0% by weight of ethanol, and a monobasic carboxylic acid ester, a fatty acid triglyceride, liquid paraffin, Plysurf A208S and a dibasic carboxylic acid diester, each in amounts as shown in Table 2.

TABLE 2

| | Additives (% by weight) | | | | | Erasability on Writing Surface | | |
|---|---|---|---|---|---|---|---|---|
| | Monobasic Acid Ester | Triglyceride | Liquid Paraffin | Plysurf A208S | Dibasic Acid Diester | Melamine | Enamel | Fluorocarbon |
| Comparative 4 | 5 | 0 | 0 | 3 | 5 | D | C | D |
| 5 | 5 | 4 | 0 | 0 | 5 | D | D | D |
| 6 | 5 | 4 | 0 | 3 | 5 | C | B | C |
| 7 | 10 | 4 | 0 | 3 | 0 | C | B | C |
| 8 | 10 | 4 | 0 | 3 | 0 | C | C | D |
| 9 | 10 | 4 | 0 | 3 | 0 | C | B | D |
| 10 | 10 | 4 | 0 | 3 | 0 | D | B | D |
| Example 7 | 10 | 4 | 1 | 3 | 0 | A | A | A |
| 8 | 10 | 4 | 1 | 3 | 0 | A | A | A |
| 9 | 10 | 4 | 1 | 3 | 0 | A | A | A |
| 10 | 10 | 4 | 1 | 3 | 0 | A | A | A |

The ink composition was then applied with a marking pen onto an impervious writing surface composed of melamine resin, enamel and fluorocarbon resin, respectively, and the erasability of the writing was evaluated after standing at a temperature of 60° C. under a relative humidity of 35% for five days in the same manner as in Example I. The results are shown in Table 2.

In Table 2, isooctyl stearate was used in Comparative Examples 4 to 6, and 9, and Examples 7 and 9 as monobasic carboxylic acid esters, and in the others a mixture of butyl isostearate and butyl palmitate in an equal weight ratio; capric acid triglyceride was used in Comparative Examples 5 to 8, and Examples 7 and 8, and in the others 2-hexyldecanoic acid triglyceride as triglycerides; and dioctyl decanedicarboxylate as dibasic acid diesters in all the examples including comparative.

As will be apparent, the ink composition which contains a monobasic acid ester, a fatty acid triglyceride and liquid paraffin as a separating agent according to the invention provides writings which are readily erasable after standing irrespectively of the materal of the impervious writing surface.

However, the ink composition of Comparative Example 4 contains a dibasic acid diester, but neither fatty acid triglyceride nor liquid paraffin, as a separating agent, forms writings scarcely erasable on impervious writing surfaces, in particular on a fluorocarbon resin surface, after standing. The ink composition of Comparative Example 5 contains no surfactant, and the writing therewith is much less erasable after standing. The addition of a fatty acid triglyceride to the composition of Comparative Example 4 improves to some extent the erasability of writings after standing, as illustrated in Comparative Example 6, however, the improvement is found insufficient.

Further, as seen in Comparative Examples 7 to 10, the ink composition which contains no liquid paraffin is generally found less erasable after standing on fluorocarbon resin surfaces.

What is claimed is:

1. An erasable ink composition for use in writing with a marking pen which comprises an organic solvent, optionally a resin soluble in the solvent, a pigment dispersed in the solvent and additives, the improvement in the additives comprising:
   (a) a fatty acid monoester of an aliphatic alcohol wherein the fatty acid has not less than six carbons in amounts of about 0.5–20% by weight;
   (b) a fatty acid triglyceride in amounts of about 0.5–20% by weight;
   (c) a higher aliphatic hydrocarbon which is liquid at normal temperatures in amounts of about 0.2–5% by weight; and
   (d) a polyoxyethylene alkyl ether phosphoric acid ester in amounts of about 0.5–7% by weight; each based on the ink composition.

2. The ink composition as claimed in claim 1 wherein the alcohol component in the fatty acid monoester has not less than two carbons.

3. The ink composition as claimed in claim 1 wherein the alcohol component in the fatty acid monoester has not less than four carbons.

4. The ink composition as claimed in claim 1 wherein the fatty acid component in the triglyceride has not less than six carbons.

5. The ink composition as claimed in claim 1 wherein the fatty acid component in the triglyceride has not less than eight carbons.

6. The ink composition as claimed in claim 1 wherein the higher aliphatic hydrocarbon is liquid paraffin.

7. The ink composition as claimed in claim 1 wherein the solvent is an alcohol, a cellosolve or a mixture of these.

* * * * *